United States Patent [19]

Frankefort

[11] Patent Number: 4,545,181

[45] Date of Patent: Oct. 8, 1985

[54] APPARATUS AND METHOD FOR OPENING AND TRANSPORTING A FLAT-FOLDED TUBE OF FLEXIBLE MATERIAL

[75] Inventor: Arnold V. Frankefort, Venray, Netherlands

[73] Assignee: Intermate B.V., Deurne, Netherlands

[21] Appl. No.: 538,428

[22] Filed: Oct. 3, 1983

[30] Foreign Application Priority Data

Nov. 8, 1982 [NL] Netherlands ............... 8204315

[51] Int. Cl.$^4$ ............................... B65B 9/14
[52] U.S. Cl. ......................... 53/459; 53/565; 53/295
[58] Field of Search ............ 53/459, 567, 576, 295, 53/291, 293, 294, 298, 292, 585, 49

[56] References Cited

U.S. PATENT DOCUMENTS

| | | | |
|---|---|---|---|
| 2,765,607 | 10/1956 | Aguilar et al. | 53/291 |
| 2,860,468 | 11/1958 | Aguilar et al. | 53/291 |
| 3,738,210 | 6/1973 | Fujio | 53/292 X |
| 4,012,972 | 3/1977 | Rice | 53/291 X |
| 4,016,704 | 4/1977 | Fujio | 53/567 X |
| 4,208,857 | 6/1980 | Fujio | 53/567 X |
| 4,288,965 | 9/1981 | James | 53/551 X |

*Primary Examiner*—Horace M. Culver
*Attorney, Agent, or Firm*—Sherman & Shalloway

[57] ABSTRACT

The operating speed of apparatus for opening and guiding a flat-folded tube of plastic wrapping film, especially a tube of heat shrinkable plastic film, which include a spreader mandrel for opening the tube and drive rollers or belts for transporting and guiding the tube over the spreader mandrel, is increased, and the overall efficiency of operation of the apparatus is improved, by providing an extension piece with a pair of driving rollers or belts which operate independently of the driving rollers associated with the spreader mandrel, at the downstream end of the mandrel. By cutting the tube at the downstream end of the mandrel, after the tube is conveyed over the extension piece and in contact with the extension piece drive rollers or belts, the cut tube section can be slid over the objects to be packaged at rates of from 2 to 5 times faster than previously possible. The extension piece can be fixedly mounted to the mandrel or it may be oscillatingly suspended from the mandrel. In the latter case, the object to be packaged need not be stationary when the opened cut tube section is being fitted thereover.

13 Claims, 1 Drawing Figure

U.S. Patent        Oct. 8, 1985        4,545,181
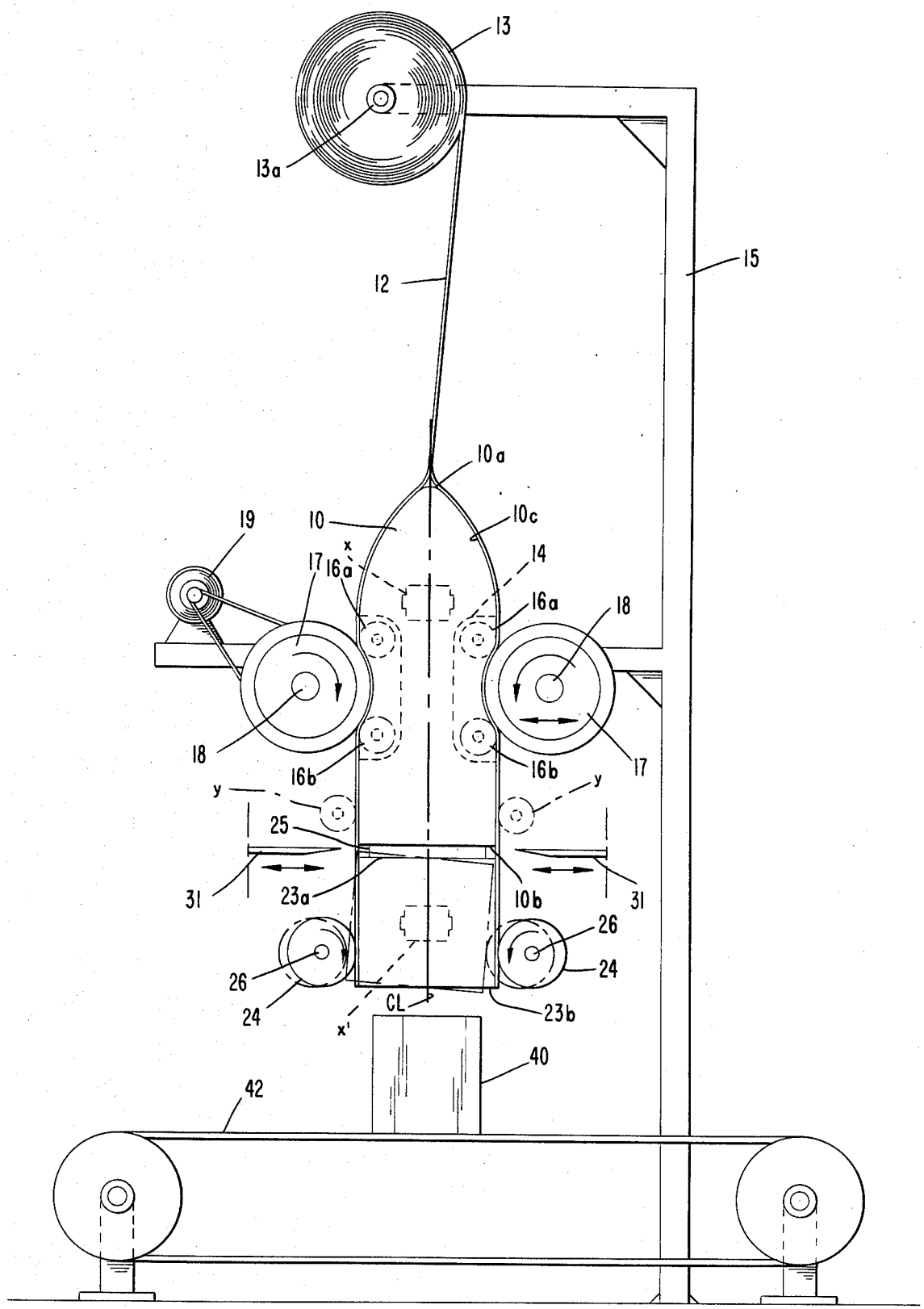

APPARATUS AND METHOD FOR OPENING AND TRANSPORTING A FLAT-FOLDED TUBE OF FLEXIBLE MATERIAL

This invention relates to an apparatus and method for guiding, to an object to be stored or packaged therein, a tube of flexible material. More particularly, this invention relates to an apparatus and method for opening and transporting a flat-folded tube of plastic film, preferably a heat-shrinkable plastic film, over a spreader mandrel and to an item or product to be packaged or stored within the plastic film.

The present invention is directed to an improvement in the method and apparatus disclosed in Netherlands patent application No. 7,810,938, laid-open for examination on May 7, 1980. According to this Netherlands patent application, a flat-folded coiled plastic tube is fed to an apparatus including a spreader mandrel on which the tube is opened and transported to the object to be packaged by appropriately placed drive rollers. In particular, the opening and conveying device disclosed in the Netherlands patent includes a spreader mandrel provided with two or more diametrically opposed recesses in each of which are mounted on parallel axes which are perpendicular to the longitudinal axis of the spreader mandrel a pair of rollers mounted such that the outer periphery of each roller coincides with the outer surface of the spreader mandrel. At least one corresponding pair of drivable rollers is provided to cooperate with the first pair of rollers for engaging the opened tube such that the tube is supported by and conveyed by the rotation of the drivable rollers as the tube passes through the nip formed between the rollers located within the recesses and the drivable rollers which protrude slightly into the recesses. A cutting device is provided at the downstream or exit end of the spreader mandrel to cut off an opened section of tube.

While the device disclosed in the Netherlands patent provides an improved means for opening a flat-folded plastic tube and conveying the opened tube to the object to be packaged, there are several drawbacks in this known method and apparatus. For example, the drivable rollers are required to both feed and convey the tube over the spreader mandrel and to convey the opened tube to the cutting means as well as to convey the tube up to the object to be packaged therein before the actual cutting takes place. The speed of the drivable rollers is limited to a maximum value determined by the strength of the tubing material with respect to overcoming the resistance to the unwinding of the supply roll of the flat-folded tube and with regard to the operation of slipping the flattened tube over the nose of the mandrel in the spreading operation. An additional drawback is that the object to be packaged must be substantially stationary under the mandrel while the section of tube to be subsequently cut-off is slipped around the product and while the actual cut of the tube section is made.

Accordingly, it is an object of the present invention to increase the speed at which the known opening and conveying apparatus can operate and to correspondingly increase the rate at which objects can be packaged using such apparatus.

It is correspondingly an object of this invention to provide an improved method for opening a flat tube of flexible heat-shrinkable plastic film and fitting the opened tube over an object to be stored or packaged therein.

It is also an object of the present invention to provide a method and apparatus for packaging objects in a tube of heat-shrinkable plastic film material wherein the object need not be satisfactory while being wrapped by the plastic film tube and wherein the object need not be in a position directly aligned with the longitudinal axis of the spreader mandrel used to open and convey the plastic tube to the object.

These and other objects of the present invention which will become more readily apparent from the following detailed description of preferred embodiments and with the aid of the accompanying drawing are provided by an improvement in apparatus for guiding a flat-folded tube of flexible film from a supply source over a spreader mandrel to open the plastic tube whereby the opened tube may be fitted over a product to be packaged or stored therein and wherein the spreader mandrel includes means for conveying the opened plastic tube to and beyond its downstream end, means for cutting off an opened tube section at the downstream end of the spreader mandrel, such improvement including an extension piece for the spreader mandrel mounted downstream of the cutting means and providing means for guiding the opened cut tube to the object to be packaged or stored therein, and drive means for driving the opened cut tube beyond the extension piece and over the object to be packaged or stored therein. The drive means can be in the form of rollers, belts, chains and similar transporting devices.

Generally, as disclosed in the Netherlands patent application No. 7,810,938, the means for conveying the plastic tube to the downstream end of the spreader mandrel preferably includes at least a first pair of rollers mounted on axes located radially inwardly of the outer periphery of the mandrel and perpendicular to and on opposite sides of the longitudinal axis of the mandrel and at least a corresponding pair of drivable rollers mounted on axes parallel to and downstream, in the direction of travel of the plastic tube, of the axes of the first pair of rollers, the axes of the drivable rollers each being located radially outwardly and an opposite sides of the outer periphery of the mandrel, whereby each of the rollers of the first pair of rollers is in peripheral linear contact with the corresponding one of the drivable rollers, such lines of peripheral contact being located at the outer periphery of the mandrel. Alternately, drive belts or other similar drive means can be used to convey and transport the opened plastic tube over the length of the spreader mandrel to the cutting means.

In one embodiment of this device, means are provided for continuously driving the drive means, e.g. a pair of drivable rollers, and for moving the drive means in and out of contact with the mandrel extension piece. In an alternative embodiment, the drive means is only intermittently driven and can be maintained in contact with the mandrel extension piece throughout the operation.

The mandrel extension piece can be mounted in a stationary or fixed position with regard to the mandrel or in a particular embodiment of the invention, the mandrel extension piece can be mounted for oscillation with respect to the longitudinal axis of the mandrel. In this embodiment, means are provided for oscillating the mandrel extension piece and for correspondingly oscillating the drive means. In this latter embodiment, the object to be packaged can be tracked by the oscillating extension piece and, accordingly, the object need not be stationary nor located directly aligned with the longitudinal axis of the spreader mandrel in order for the opened and cut section of tube to be placed over the object.

The present invention also provides a method for fitting an opened tube of flexible heat-shrinkable plastic film over an object to be stored or packaged therein. This method includes the steps of (a) feeding a flat-folded tube of the plastic film over a spreader mandrel to spread open the flat-folded tube, (b) using an extension piece at the downstream end of the spreader mandrel, the extension piece having a length of substantially the same dimension as the height of the object to be stored or packaged therein, (c) transporting the opened tube over the spreader mandrel to the downstream end of the extension piece, (d) cutting the opened tube just beyond the downstream end of the spreader mandrel to form an opened cut tube section to be transported over the extension piece to the object, (e) feeding the object to a position below the extension piece, (f) substantially simultaneously with step (e), contacting the opened cut tube section with a driving device to transport and guide the opened cut tube section over the extension piece to and over the object, and (g) repeating steps (a) through (f) at least once.

By providing the extension piece at the downstream or exit end of the spreader mandrel and beyond the cutting device and by including separate drive means for the cut-off section of the opened tube to press against and convey the cut-off section of tubing, there is a separation between the feeding of the plastic tube material onto the spreader mandrel on the one hand and the slipping of the cut-off section of tubing over and around the object, on the other hand. Accordingly, the drive means for the cut-off section of tubing associated with the extension piece can be driven at high speed so that the slipping of the tubing onto the object can be accomplished in a much shorter time than the feed operation. By virtue of this speed differential, the objects to be packaged need to be maintained in a stationary position, if at all, for a shorter time than in the known device whereby the overall speed of conveyance and the packaging speed can be proportionately increased. Furthermore, when the objects to be packaged have a tapering top, such as in the case of many types of bottles, or other types of conical objects, it becomes possible, due to the faster rate at which the opened cut tube section can be transported, to move the objects continuously under the mandrel and extension piece therefor.

As previously noted, it is possible in one embodiment of the invention to cause the drive means associated with the extension piece to be continuously driven and to provide means to bring the drive means into and out of contact with the extension of the mandrel. According to this preferred embodiment, there will be no loss of time while the drive means come up to speed as in the case of intermittent operation. It is only necessary that the drive means, e.g. rollers or belts, must be withdrawn from the extension piece after an opened cut tube section is conveyed over and beyond the extension piece whereby a new tubing section can be fed over the extension piece and the operation continued in this fashion.

As also mentioned above, in one preferred embodiment of the invention, the extension piece is suspended from the spreader mandrel in a fashion to be able to oscillate about the longitudinal axis of the speader mandrel, e.g. as a pendulum. The extension piece can then swing to a predetermined degree, whereby slight deviations in the position of the object, i.e. when it is not exactly coaxial with the mandrel, can be tolerated. Naturally, in this case, the drive means associated with the extension piece must also be able to accompany this oscillating movement. This embodiment therefor not only enables continuous feeding and packaging of objects which taper towards their top end, but also non-tapering objects or objects which are as wide or wider at their top end than at their bottom end.

Any suitable drive means may be used to transport and convey the cut-off section of tubing over the mandrel extension piece to and over the object to be packaged. These drive means are conveniently provided by one or more pairs of drivable rollers mounted on axes perpendicular to the longitudinal axis of the spreader mandrel, and being located adjacent the extension piece, i.e. either in direct contact with, or movable to come into contact with, the extension piece, so that the plastic tubing can be conveyed by rotation of the drivable rollers over and beyond the extension piece. Alternately, the drivable rollers can be replaced by suitable drive belts or chains, driven by any suitable means. The drive belts or chains should not, of course, include any protrusions or rough surfaces which could puncture, tear or cause damage to the plastic tubing. Furthermore, the belts or chains can be made relatively wide or narrow with respect to the width of the tubing and can extend over substantially the entire length of, or over only a fraction of the length of the cut-off tubing section. It is only necessary that sufficient contact be made between the drive means and the cut-off tubing section to positively engage the latter to ensure that the cut-off tubing section will be transported without slippage.

The invention will be illustrated below in greater detail with reference to exemplary embodiments thereof, and with reference to the accompanying drawing in which, the single FIGURE is a schematic side elevation view of an embodiment of the apparatus according to the invention and including the conveying means for conveying an object to be packaged.

The FIGURE shows the spreader mandrel 10, which may be fabrciated from hard material, e.g. plastic, metal, etc. having a smooth outer surface so as not to tear or scratch the plastic film of the flat-folded tube 12 which comes into contact therewith. The mandrel serves to open and spread the sides of the flat-folded tube 12 of plastic film, preferably a heat-shrinkable plastic film, which is supplied from a suitable supply source, such as coiled on supply roll 13, which can rotate on shaft 13a in frame 15.

Mandrel 10 is provided at two diametrically opposed portions around its outer periphery 10c and intermediate its tapered feed or inlet end 10a and its downstream or exit end 10b with recesses 14. These recesses each house a first pair of rollers 16a and an additional pair of rollers 16b. Rollers 16a and rollers 16b are rotatably mounted on parallel axes which are located radially inwardly of the outer periphery 10c and perpendicular to and on opposite sides of the longitudinal axis CL of the mandrel.

Mandrel 10 is mounted vertically in the space between a corresponding pair of drivable rollers 17 rotatably mounted on axes 18 in frame 15. Axes 18 are parallel to each other and also to the axes of rollers 16a and rollers 16b. As seen in the FIGURE axes 18 are located radially outwardly and on opposite sides of the outer periphery of mandrel 10, and are mounted in a common horizontal plane which is located downstream of the horizontal plane passing through lower rollers 16b. The diameter of each of drivable rollers 17 is such that each of these rollers protrude slightly into the respective recesses 14 and make peripheral linear contact with the respective ones of the upper rollers 16a and lower rollers 16b with the lines of linear contact being located substantially at the outer periphery of mandrel 10. That is, the gap or space between the drivable rollers 17 is somewhat smaller than the distance between the outermost parts of rollers 16a. Accordingly, it can be seen that the spreader mandrel is supported with its upper rollers 16a resting on the pair of drivable rollers 17.

The lower rollers 16b are optional, but when they are used, they serve as auxiliary support rollers and prevent undesirable oscillation of the mandrel between rollers 17. Rollers 16b can be replaced or supplemented with auxiliary support rollers x and/or y (shown by dotted lines) mounted on frame 15 to provide the necessary stability. These auxiliary support rollers x and y can press elastically against the outer surface 10c of the mandrel.

The tube 12 to be spread open can be slipped with its downward hanging end onto the top of the mandrel 10 until this end has come between drivable rollers 17 and rollers 16a and 16b. When rollers 17 are driven in the direction of the arrow, by means such as electric motor 19, for example, or, alternatively, by an hydraulic or pneumatic motor, the tube is drawn downward over the mandrel which is typically cylindrical. Up to this point, the device described is similar to that described in the Netherlands patent application mentioned above.

According to the invention, mandrel 10 is provided with an extension piece 23 projecting beyond auxiliary rollers y if present. The height of this extension, i.e. the length along the center line CL of the mandrel, is approximately equal to the height of the objects to be packaged. In the illustrated embodiment, as shown in solid lines, extension piece 23 is fixed firmly to the mandrel 10 and can guide an opened cut tube section to the object to be stored or packaged therein.

At or near the lower or downstream end 23b of the extension piece 23 a second pair of drivable rollers 24 are mounted rotatably on axes 26 which are in diametrical opposition to each other and are perpendicular to the longitudinal axis CL of mandrel 10. These rollers 24 can be driven in any suitable manner, not shown in more detail, but about which more is said below, for transporting the opened cut tube beyond the extension piece and over the object to be packaged or stored therein.

Between the end 10b of mandrel 10 and the upper end 23a of the extension pice 23 there is an annular groove 25, level with two horizontal cutting knives 31 mounted outside the mandrel, which can move back and forth horizontally in the direction of the arrows.

Below the extension piece, a conveyor belt 42 is shown, with an object 40 thereon.

In operation, the apparatus works as follows: As support rollers 17 are driven, a section of the tube 12 which may initially be fed manually to the nip between rollers 16a and 17, is spread and guided with its open end to a point level with or slightly below rollers 24. The knives are then actuated, and the section of the tube which is over extension piece 23 is cut off. Next, rotating rollers 24 are in contact with the cut-off portion of the tube and move it downward to slip it over the object 40 that is fed into position, by conveyor belt 42, directly below the extension piece. The conveyor belt intermittently moves the objects fitted with a wrapper to one end of this belt, where they are transferred to a shrinking device, for example, a heat oven, where under the influence of heat, the tube wrapper shrinks around the object to produce the desired package.

As soon as knives 31 have cut off the lower tube portion, rollers 17 can once more begin to feed a new section of tube. In the meantime, conveyor belt 42 moves a new object 40 into the proper position, coaxial to the centerline of the mandrel, and rollers 24 are actuated, which can turn at a much higher speed than the rollers 17 because they do not experience resistance from the supply roll 13 and the spreading of the tube, as in the case of drive rollers 17. Due to the higher speed of rollers 24, excessive force on the tube section is avoided.

It is possible to drive rollers 24 continuously, and, for example, to mount their axes in pivoting arms (not shown), when then swing rollers 24 toward extension piece 23 only when an object 40 is coaxial with the mandrel.

It is also possible to mount rollers 24 in a fixed position and to drive them only when an object is coaxial to the mandrel.

Auxiliary support rollers x' can be disposed, with respect to extension piece 23, in the same way as support rollers at the upper end of the mandrel, to stabilize the mandrel extension piece. However, it is also possible to provide the mandrel extension piece as a component separate from mandrel 10 and to suspend it from mandrel 10 so that it is free to oscillate, for example, in a pendulum-like motion, such as shown by dotted lines, or the extension piece can be moved in a horizontal plane, e.g. parallel to the movement of the upper leg of conveyor belt 42.

While a tube section is slipped onto mandrel 10 and while the cutting knives 31 are in action, the object to be packaged need not be coaxial with the mandrel, but can be brought up by conveyor belt 42 during this time. Only after knives 31 have functioned and the tube around the mandrel extension piece 23 has been cut must the object be coaxial to the mandrel, since this is the time when rollers 24 slip the plastic tube wrapping onto the object at high speed. During the subsequent removal of the wrapped object, the feeding of a fresh tube section over the mandrel can be initiated. In the meanwhile, still another new object is brought under the mandrel. As a result, the object need be stationary under the mandrel for a shorter time than with the known device. The average conveyor speed of the objects is higher. The packaging speed can, therefore, be increased by a factor of 2 to 5 as compared with the known device in which the extension piece is not provided.

In the case of objects that taper somewhat at the top, the conveyor belt 42 can be run continuously, so that the object actually does not stop under the mandrel. Due to the high driving speed of rollers 24, the cut tube wrapping can still be slipped onto the moving object. This is also possible in the case of nontapering products, particularly when mandrel extension piece 23 is suspended so that it is free to oscillate as described above.

In place of rollers 17 and/or rollers 24 drive belts or drive chains, or other similar drive means can be used to convey and transport the plastic tubing over the spreader mandrel 10 and/or over the extension piece 23. Similarly, any of the auxiliary or optional rollers x, x' and y can be replaced or supplemented by drive belts.

It will be understood, therefore, that while the invention has been described particularly with reference to preferred embodiments thereof, various changes may be made all within the full and intended scope of the claims which follow.

What is claimed is:

1. In apparatus for guiding a flat-folded tube of flexible plastic film from a supply source over a spreader mandrel to open the plastic tube whereby the opened tube may be fitted over an object to be packaged or stored therein, wherein the spreader mandrel includes means for conveying the opened plastic tube to and beyond its downstream end, and means for cutting off an opened tube section at the downstream end of the spreader mandrel independently of the location of said object, the improvement comprising an extension piece for said spreader mandrel mounted downstream of said cutting means and providing means for guiding the opened cut tube to the object to be packaged or stored therein with said object being spaced apart from said extension piece, and drive means, operating independently of said conveying means and without any contact between said object and said extension piece, for driving the opened cut tube beyond the extension piece and over the object to be packaged or stored therein.

2. The apparatus of claim 1 wherein said drive means comprises a pair of drivable rollers mounted on axes perpendicular to the longitudinal axis of the spreader mandrel and located adjacent to said extension piece.

3. The apparatus of claim 1 which further comprises means for continuously driving the drive means and means for moving the drive means in and out of contact with the mandrel extension piece.

4. The apparatus of claim 3 wherein the drive means comprises at least one drivable roller.

5. The apparatus of claim 3 wherein the drive means comprises at least one drive belt.

6. The apparatus of claim 1 which further comprises means for intermittently driving th drive means and means for maintaining the drive means in contact with the mandrel extension piece.

7. The apparatus of claim 6 wherein the drive means comprises at least one drive roller.

8. The apparatus of claim 6 wherein the drive means comprises at least one drive belt.

9. The apparatus of claim 1 which further comprises means for oscillating the mandrel extension piece with respect to the longitudinal axis of the mandrel and means for correspondingly oscillating the drive means.

10. A method for fitting an opened tube of flexible heat-shrinkable plastic film over an object to be stored or packaged therein, said method comprising
   (a) feeding a flat-folded tube of the plastic film over a spreader mandrel to spread open the flat-folded tube,
   (b) using an extension piece at the downstream end of the spreader mandrel, said extension piece having a length of substantially the same dimension as the height of the product to be stored or packaged therein,
   (c) transporting the opened tube over the spreader mandrel to the downstream end of said extension piece,
   (d) cutting the opened tube just beyond the downstream end of the spreader mandrel to form an opened cut tube section to be transported over said extension piece to the object,
   (e) feeding the object to a position below the extension piece,
   (f) substantially simultaneously with step (e), contacting the opened cut tube section with driving rollers to transport and guide the opened cut tube section over the extension piece to and over the object, and
   (g) repeating steps (a) through (f) at least once.

11. The method of claim 10 wherein said object to be stored or packaged is tapered at its upper end and wherein in step (f) the driving rollers transport and guide the opened cut tube section over the extension piece to and over the object while the object is still moving at a position below the extension piece.

12. The method of claim 10 wherein the object to be packaged is fed to a position coaxial with the spreader mandrel subsequent to step (d).

13. The apparatus of claim 1 wherein the extension piece has a length of substantially the same dimension as the height of the product to be stored or packaged therein.

* * * * *

UNITED STATES PATENT AND TRADEMARK OFFICE
CERTIFICATE OF CORRECTION

PATENT NO. : 4,545,181
DATED : October 8, 1985
INVENTOR(S) : ARNOLD C. FRANKEFORT It is certified that error appears in the above-identified patent and that said Letters Patent is hereby corrected as shown below:

ON THE TITLE PAGE

[75] Inventor: delete "Arnold V. Frankefort", insert --Arnold C. Frankefort--.

Signed and Sealed this

Third Day of December 1985

[SEAL]

Attest:

DONALD J. QUIGG

Attesting Officer

Commissioner of Patents and Trademarks